2,857,425

PURIFYING SULFONATED OIL

Charles C. Kline, Wallingford, and Elwood C. Van Leer, Springfield, Pa., assignors to Sun Oil Company, Philadelphia, Pa., a corporation of New Jersey No Drawing. Application November 28, 1956
Serial No. 624,720

5 Claims. (Cl. 260—504)

This invention relates to the removal of oil-insoluble sulfonic acids from sulfonated petroleum.

Most of the oil-insoluble, or "green," sulfonic acids produced in sulfonation of petroleum fractions are usually separated from the sulfonated, or "sour," oil containing dissolved "mahogany" sulfonic acids by allowing the green acids to settle out as a lower immiscible layer. The sour oil can be diluted with lower viscosity hydrocarbons prior to such operation, and a plurality of such operations in series can be performed with diluent present in one or more of the operations. However, the resulting sour oil still often contains small amounts of suspended finely divided solid green acids, which are difficult or impossible to remove by further settling operations. The suspended acids usually darken the oil to a disadvantageous extent and cause other difficulties making it desirable to remove them.

In typical operation, the amount of green acids produced in sulfonation is within the approximate range from 2 to 10 weight percent based on sour oil. Most of the green acids are removed in the first settling operation, and the effluent sour oil from the latter typically contains 1 to 2 weight percent of green acids. The effluent sour oil from any subsequent settling operations typically contains 0.1 to 1.0 weight percent of green acids. The above percents are based on diluent-free sour oil.

It has been proposed previously to filter the effluent sour oil together with diluent through a plate-and-frame press or a rotary filter to remove the suspended green acids. Such operation is unsatisfactory however in that the filter cloths rapidly plug up, making it impossible to run the filter continuously for satisfactory periods of time.

The present invention provides highly satisfactory removal of suspended green acids from sour oil by passing the latter upwardly through a bed of fiber glass. It has been found that good removal of the green acids can be obtained over extended periods of time without excessive pressure drop or other results of plugging of the fiber glass.

Preferably, the sour oil as initially contacted with the fiber glass contains 0.1 to 1.0 weight percent of green acids, based on diluent-free sour oil, and more preferably not more than 0.5 weight percent. Thus, the green acid content is preferably reduced to the indicated level prior to the fiber glass contacting. However sour oils having other green acid contents can also be treated.

The fiber glass used preferably has average fiber diameter within the approximate range from 0.002 to 0.008 inch and bulk density within the approximate range from 0.5 to 10 pounds per cubic foot, more preferably 1 to 5 pounds per cubic foot. Fiber glass, or glass wool, having smaller fiber diameter and/or greater bulk density, generally is disadvantageous in that it results in excessive pressure drop and rapid plugging, when used as the sole material in the bed. On the other hand, fiber glass having larger fiber diameters and/or smaller bulk densities, generally is disadvantageous in that it does not provide effective removal of green acids.

Preferably, after passing through the fiber glass bed, the sour oil is passed through a layer of glass wool. Glass wool has smaller fibers than the fiber glass employed according to the invention, the fiber diameter of glass wool usually being within the approximate range from 0.00035 to 0.00080 inch, and provides an efficient means of obtaining removal of green acids remaining in the effluent from the fiber glass bed. Glass wool cannot however be satisfactorily used for the entire operation. Preferably, the height of the glass wool layer is 0.05 to 0.2 times the height of the bed of fiber glass. Preferably, where glass wool is used, the direction of flow therethrough is upward, though downward flow can be employed if desired. Passage of the sour oil through any other suitable filter medium, instead of or in addition to, passage through glass wool is also within the scope of the invention.

The temperature of the sour oil purification according to the invention is preferably in the approximate range from room temperature to 200° F., though any temperature which is not so high as to cause excessive decomposition of the sour oil, and which is not so low as to provide too high viscosity of the sour oil can be employed. On completion of the sulfonation, the sour oil is usually hot as a result of the exothermic nature of the sulfonation, and it is usually desirable to conduct the green acid settling step or steps and the fiber glass treatment according to the invention without much time lapse and without a special cooling step. Accordingly, elevated temperatures of, say, 100° F. to 150° F. are frequently encountered in the process according to the invention. However, a special cooling step or sufficient time lapse to reduce the temperature to, say, 50° F. to 100° F. can be employed if desired, since such temperature favors removal of green acids. The temperature should be above the solidification temperature of any wax which may be contained in the sour oil. Temperatures of 80° F. or above may be required in the case of some waxy oils. In cases where the oil is wax-free, considerably lower temperatures can be employed.

Preferably, the operation according to the invention is carried out in the presence of a diluent for the sour oil. Preferred diluents are petroleum hydrocarbon fractions, e. g. naphtha, alkylate, pentane, etc., having lower viscosity than the sour oil. Preferred amounts of diluent are 0.5 to 2 volumes per volume of sour oil, though other proportions can be employed.

Preferred flow rates of liquid charge, including diluent if any, in the process according to the invention are those within the approximate range from 100 to 1500 gallons of liquid charge per hour per square foot of bed cross section, more preferably 600 to 1200 gallons per hour per square foot.

When the bed has become substantially filled with green acids, it can be cleaned out with water or aqueous alkali to render it again suitable for removal of more green acids from sour oil. The aqueous cleaning material can be passed either upwardly or downwardly through the bed. The washings can be commingled with the green acids or salts obtained at other stages of the process, or otherwise disposed of. When water is used as washing agent, the green acids are removed as such; when aqueous caustic is used, they are removed in the form of salts.

The process of the invention is applicable to sour oil produced by any of the well known processes for sulfonation of petroleum to produce mahogany and green sulfonic acids. Typical sulfonating agents for use in such processes are concentrated sulfuric acid, oleum, anhydrous $SO_3$, chlorosulfonic acid, etc. Examples of the preparation of suitable gaseous sulfonating agents are given in F. E. Anderson United States Patent No. 2,722,543 issued November 1, 1955. Typical amounts of sulfonating agent are those providing 10 to 30 pounds of $SO_3$ or equivalent per barrel of sulfonation charge. Typical temperatures are those within the approximate range from room temperature to 300° F. Continuous or batch operation can be employed. Typical Saybolt Universal viscosities for sulfonation charge stocks are those within the approximate range from 100 to 2500 seconds at 100° F. Examples of suitable sulfonation charge stocks and sulfonation conditions are given in C. A. Cohen United States Patent No. 2,413,311 issued December 31, 1946, and M. R. Lipkin et al. United States Patent No. 2,680,716 issued June 8, 1954.

The sour oil from which suspended green acids have been removed by the process of the invention has generally improved properties for use of the mahogany acids contained therein. The mahogany acids may be converted to alkali metal soaps for use as emulsifying agents, e. g. in emulsifiable cutting oil compositions, or to heavy metal soaps, e. g. barium or calcium soaps, for use as detergent additives for motor oil, etc.

The process according to the invention is advantageous in that the removal of suspended green acids can be obtained without a subsequent settling step, though such step can be performed if desired. The passage through the glass fibers provides not only agglomeration of the suspended solids, but removal of the agglomerates by the fiber bed.

The following examples illustrate the invention:

*Example I*

Sour oil containing dissolved mahogany acids and suspended green acids, obtained by sulfonation of a petroleum lubricating oil distillate with a mixture of air and vaporized anhydrous $SO_3$, was settled at about 170° F. to remove green acids. The decanted sour oil was diluted with 0.7 volume of aviation alkylate per volume of sour oil and settled at 130° F., to remove additional green acids. The decanted solution contained an average of about 0.25 weight percent of suspended green acids based on total effluent from the settler, or about 0.425 weight percent based on diluent-free sour oil. This solution was passed at 95° F. upwardly through a bed of fiber glass five inches in diameter and 42 inches in total height. The glass fibers had average diameter of 0.006 inch and bulk density of about 3 pounds per cubic foot. The rate of passage of the mixture of oil and diluent through the bed varied from 148 to 225 gallons per hour per square foot of bed cross section through the run, which lasted 53 hours. Good removal of green acids was obtained throughout the run, the average green acid content of the effluent during the run being about 0.05 weight percent, and the green acid content of the effluent at the end of the run also being about 0.05 weight percent, these percents being based on total liquid.

*Example II*

A similar run was made using a bed of glass fibers having average diameter of 0.008 inch and bulk density of about 2.5 pounds per cubic foot. The oil flow rate was 240 to 273 gallons per hour per square foot through a 29 hour run. The average reduction in green acid content was from about 0.16 weight percent to about 0.05 weight percent based on total liquid, the green acid content of the effluent at the end of the run being about 0.05 weight percent based on total liquid.

*Example III*

A similar run was made using a bed of glass fibers having average diameter of 0.008 inch, the oil flow rate being 880 gallons per hour per square foot through a 38 hour run. The average reduction in green acid content was from about 0.15 weight percent to about 0.06 weight percent based on total liquid, the green acid content of the effluent at the end of the run being about 0.03 weight percent based on total liquid.

Examples I to III show that good removal of green acids over a prolonged period of time can be obtained using 0.006 inch or 0.008 inch fiber glass and flow rates from 148 to 880 gallons per hour per square foot.

*Comparison Example I*

A similar run was made using 0.008 inch fiber glass, but passing the oil downwardly, rather than upwardly through the bed. The flow rate was 250 gallons per hour per square foot. After only three hours of operation, the reduction in green acid content was only from about 0.12 percent to 0.09 percent based on total liquid. The following table provides a comparison of the results obtained in this run with those obtained according to the invention in Example II.

| Direction of Flow | Length of Run, Hrs. | Average Percent Removal of Green Acids |
|---|---|---|
| Up | 29 | 70 |
| Down | 3 | 35 |

These results show the necessity for employing upflow according to the invention in order to obtain satisfactory results.

The removal of green acids according to the invention improves the color of the sour oil and the mahogany sulfonates recovered therefrom. Thus, as an illustration, in Example I, the effluent sour oil was neutralized with sodium hydroxide, and the sodium mahogany sulfonates were extracted from the neutralized sour oil with aqueous isopropanol. A 15 percent solution of the mahogany sulfonates in xylene had NPA color of 5. A solution prepared in the same manner from the sour oil prior to contacting with fiber glass had NPA color of 7.

The fiber glass bed employed according to the invention preferably is composed of the well known fiber glass mats, as described for example in an article by C. A. Smucker et al., in "Industrial and Engineering Chemistry," volume 46, pages 176–8 (1954). The mats frequently contain a chemical bonding material to provide mechanical strength. This bonding material can either be removed by suitable known means, usually after installation of the fibers in the contacting bed and prior to contacting sulfonated oil with the bed, or left in the fibers during the latter contacting.

Preferred means for periodically removing green acids from the fiber glass bed involve washing with aqueous caustic alkali, followed by water washing and blowing with air to remove excess water. It has been found that good removal of green acids from additional sour oil can be obtained with fiber glass beds which have been previously used until substantially filled with removed green acids and then treated according to this procedure.

The invention claimed is:

1. Process for refining sulfonated petroleum which comprises passing sulfonated petroleum containing suspended oil-insoluble sulfonation products upwardly through a bed of fiber glass, and removing from the bed sulfonated petroleum from which at least a portion of said products have been removed.

2. Process according to claim 1 wherein the sulfonated petroleum is subsequently passed through a layer of glass wool, the height of the glass wool layer being 0.05 to 0.2 times the height of said bed.

3. Process according to claim 1 wherein a mixture of sulfonated petroleum and 0.5 to 2 volumes of diluent per volume of sulfonated petroleum is passed through the bed at a rate of 100 to 1500 gallons of mixture per hour per square foot of bed cross section.

4. Process according to claim 1 wherein the bed is periodically washed with aqueous caustic soda to remove oil-insoluble sulfonation products therefrom.

5. Process according to claim 1 wherein said fiber glass has average fiber diameter of 0.002 to 0.008 inch.

References Cited in the file of this patent

UNITED STATES PATENTS

| | | |
|---|---|---|
| 2,140,263 | Kessler et al. | Dec. 13, 1938 |
| 2,413,311 | Cohen | Dec. 31, 1946 |
| 2,760,970 | LeSuer | Aug. 28, 1956 |

OTHER REFERENCES

Smucker et al.: "Industrial and Engineering Chemistry," vol. 46, pp. 176–8 (3 pp.) (1954).